(12) United States Patent
Kohn et al.

(10) Patent No.: US 8,156,138 B2
(45) Date of Patent: Apr. 10, 2012

(54) SYSTEM AND METHOD FOR PROVIDING TARGETED CONTENT

(75) Inventors: Tyler Kohn, New York, NY (US); David Selinger, Castro Valley, CA (US); Michael DeCourcey, Belmont, CA (US)

(73) Assignee: RichRelevance, Inc., San Francisco, CA (US)

( * ) Notice: Subject to any disclaimer, the term of this patent is extended or adjusted under 35 U.S.C. 154(b) by 689 days.

(21) Appl. No.: 11/823,453

(22) Filed: Jun. 26, 2007

(65) Prior Publication Data

US 2009/0132553 A1    May 21, 2009

(51) Int. Cl.
*G06F 7/00* (2006.01)
*G06F 17/30* (2006.01)

(52) U.S. Cl. .................................. 707/769

(58) Field of Classification Search .............. 707/3, 769, 707/999.003
See application file for complete search history.

(56) References Cited

U.S. PATENT DOCUMENTS

| | | | |
|---|---|---|---|
| 5,619,709 A * | 4/1997 | Caid et al. | 715/209 |
| 7,346,606 B2 * | 3/2008 | Bharat | 707/3 |
| 2003/0158855 A1 * | 8/2003 | Farnham et al. | 707/102 |
| 2004/0117395 A1 * | 6/2004 | Gong et al. | 707/101 |
| 2005/0076095 A1 | 4/2005 | Mathew et al. | 709/217 |

* cited by examiner

*Primary Examiner* — Aleksandr Kerzhner
(74) *Attorney, Agent, or Firm* — Seed IP Law Group PLLC

(57) ABSTRACT

An arrangement for providing targeted content includes data repositories storing information from which targeted content may be selected. The data repositories store at least one contextual relationship graph. The arrangement also includes an input/output interface through which a request for targeted content is made. The arrangement further includes a controller that receives the request for targeted content and selects targeted content using the contextual relationship graph. The controller further provides the selected targeted content through the input/output interface. An arrangement for determining the relative strength of a classification for a group of words includes memory for storing a contextual relationship graph for a given classification and a processor that receives the contextual relationship graph and a plurality of words to be analyzed by the processor, identifies occurrences of the relationships identified in the contextual relationship graph and determines the relative strength of classification based on the identified occurrences.

41 Claims, 3 Drawing Sheets

SYSTEM AND METHOD FOR PROVIDING TARGETED CONTENT

TECHNICAL FIELD

The disclosed embodiments relate generally to a system and method for providing targeted content. More specifically, the present subject matter relates to a system and method for providing targeted content, such as advertising content on a web page, by analyzing the context in which the content is to be provided in light of known attributes of the content available to be provided.

BACKGROUND

Providing targeted content can be beneficial to both the provider and the recipient. For example, in an advertising context, both the advertiser and the consumer benefit from targeted ads; the consumer receives ads that are relevant to his or her interests and the advertiser gets improved response to those targeted ads. In order to provide targeted content, the provider must both possess and effectively utilize information about the recipient and further the provider must also posses and effectively utilize information about the content from which the selected content will be selected.

Accordingly, it may be beneficial to provide targeted content, such as, for example, targeted advertisements on a web page. However, there are known problems in scenarios such as these in both acquiring information about the recipient of the advertisements and effectively utilizing that information to provide relevant targeted advertisements.

The problem of acquiring information about a recipient, and specifically a recipient of advertisements on a web page, is known as a classification problem. A significant portion of this classification problem is in classifying the current context of the recipient. There are two common approaches to the context classification problem typically associated with providing targeted content, particularly in providing targeted advertising on a web page: the bucket of words approach and natural language processing.

The bucket of words approach utilizes a context independent analysis of text to determine which words are being used more often than statistically expected in order to determine the subject matter of the text. This approach can be applied to both the web page content and the advertisement content. For example, through analysis of a web page it may be determined that the words "allergy" and "pollen" appears more often than statistically expected. The bucket of words approach interprets this occurrence as demonstrating the web page content is directed to seasonal allergies. The content provider may then use the results of that analysis to determine that visitors to this web page are more likely than the general population to be interested in advertisements regarding seasonal allergy medication and provide an appropriately targeted advertisement. The bucket of words solution is a fairly inaccurate solution in that the words are analyzed without regard to context and relationship to other words on the web page. Unfortunately, this solution often does not provide strong contextual relationships and the results can be skewed heavily by inadequate and/or false information and, therefore, is not optimally targeted.

The natural language processing approach utilizes the basic concepts of the bucket of words approach, but uses contextual extraction (e.g., noun, verb, etc.) to improve the accuracy of the results. Although this approach improves the accuracy of the results, it is also a much slower process, particularly because the content of the web page must be prefiltered in order for the analysis to be effective. Because certain contextual clues are dependent on the vertical market addressed by the web page (the subject matter, i.e., trade based content, content based on specialized needs, for example, medical, mechanical engineering, etc.) different filters must be used for each vertical market. Prefiltering involves human involvement in the process and therefore decreases the efficiency of the process by requiring important steps to be performed offline. As a result, natural language processing cannot be used to run an online real-time analysis of web pages to provide targeted content.

While it is possible to apply the bucket of words approach and the natural language processing approach to classify the targeted content, in many cases related web pages and advertisements are difficult to match together because the classification trees for each are not congruous, even though the subject matter may be. These problems can be dealt with by adding another layer of human involvement in the process, further decreasing efficiency, or by accepting further limitations on optimizing the targeted content.

The bucket of words approach and the natural language processing approach are therefore not complete solutions to the problems associated with providing targeted content. The results provided by these approaches are simply groups of words, such as grammar graphs, that may be used to identify the context of the group of words analyzed. However, these sets of words do not provide any map or instructions to link the words/context to targeted content. Moreover, neither solution is capable of analyzing large numbers of words with respect to each of the other words in the set. For example, a naïve Bayes classifier, or similar independent feature model, is only capable of computing pairs or tuples at best, before the model becomes too complex and computationally intractable.

A typical solution for online processing problems is to add more processing power. However, the challenges presented by the classification problem cannot be simply addressed by increasing the processing power of the system. Accordingly, an entirely new approach must be developed in order to provide an improved solution to the classification problem for providing targeted content.

Therefore, a need exists for a system and method wherein targeted content can efficiently be provided while also providing a strong contextual relationship.

SUMMARY

The above and other needs are met by the disclosed embodiments which provide a system and method for providing targeted content. The solutions provided utilize a hierarchical predictive projection that is fundamentally different from the classification analyses that have previously been used to address the problems associated with selecting targeted content. Whereas classification solutions are useful in identifying a subject, they are not as effective in predicting valuable associations between the content available to be provided and the attributes of the target. An example of a classification solution is "this user is from New York." An example of a hierarchical predictive projection is "this user is likely to be interested in tickets to see the New York Yankees."

In one example, the disclosed embodiments solve these problems, at least in part, by utilizing an arrangement that provides targeted content. The arrangement includes one or more data repositories storing information from which targeted content may be selected. The one or more data repositories further store information including at least one contextual relationship graph. The arrangement also includes an input/output interface through which a request for targeted content is made, wherein said request includes request-associated attributes. Further, the arrangement includes a controller that receives the request for targeted content through the input/output interface and selects targeted content using the request-associated attributes and at least one contextual relationship graph, wherein the controller further provides the selected targeted content through said input/output interface.

In another example, the disclosed embodiments solve these problems, at least in part, utilizing a computer-readable medium having computer-executable instructions for selecting targeted content using a controller in an arrangement, the computer-executable instructions performing the steps of: receiving, in the arrangement, a request for targeted content including request-associated attributes; and using a controller to select targeted content from one or more data repositories, wherein selecting targeted content includes utilizing, in the selection process, the request-associated attributes and at least one contextual relationship graph related to the information from which targeted content may be selected.

In yet another example, the disclosed embodiments solve these problems, at least in part, by a method of selecting targeted content via an arrangement, the method includes the steps of: receiving, in the arrangement, a request for targeted content a request for targeted content including request-associated attributes; and without human intervention, selecting targeted content from one or more data repositories, wherein selecting targeted content includes utilizing, in the selection process, the request-associated attributes and at least one contextual relationship graph related to the information from which targeted content may be selected.

In a further example, the disclosed embodiments solve these problems, at least in part, by utilizing an arrangement for determining the relative strength of a classification for a group of words. The arrangement including memory for storing a contextual relationship graph for a classification, wherein the contextual relationship graph includes a plurality of keywords and data regarding the relationship between each of the plurality of keywords. The arrangement also including a processor that receives the contextual relationship graph and a plurality of words to be analyzed by said processor, identifies occurrences of the relationships identified in the contextual relationship graph and determines the relative strength of classification based on the identified occurrences.

In a still further example, the earlier stated needs and others are further met by still other disclosed embodiments that enable a computer-readable medium having computer-executable instructions for determining the relative strength of a classification for a group of words, the computer-executable instructions causing the arrangement to perform the steps of: receiving, in the arrangement, a contextual relationship graph for a classification and a plurality of words to be analyzed; identifying occurrences of the relationships identified in the contextual relationship graph; and determining the relative strength of classification based on the identified occurrences.

In another example, the earlier stated needs and others may further be met by a method of discovering and assigning data regarding contextual content of a group of words via an arrangement, the method comprising the steps of: receiving, in the arrangement, a contextual relationship graph for a classification and a plurality of words to be analyzed; identifying occurrences of the relationships identified in the contextual relationship graph; and determining the relative strength of classification based on the identified occurrences.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PREFERRED EMBODIMENTS

Figure 1:
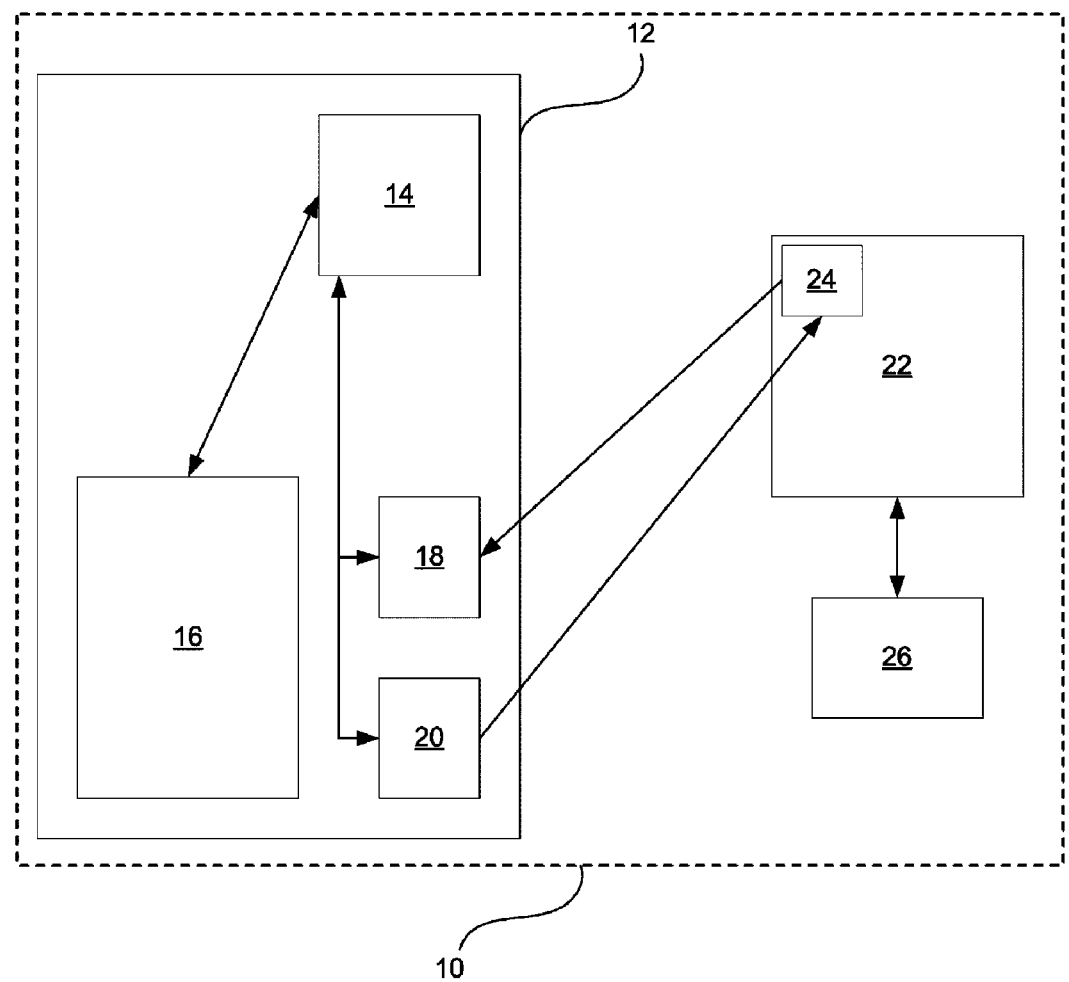
FIG. 1 is a schematic of a system for providing targeted content.

It is contemplated that the subject matter described herein may be embodied in many forms. Accordingly, the embodiments described in detail below are the presently preferred embodiments, and are not to be considered limitations.

The disclosed embodiments address problems related to providing targeted content. The disclosed embodiments solve these problems, at least in part, by utilizing an arrangement that provides targeted content. The arrangement includes one or more data repositories storing information from which targeted content may be selected The one or more data repositories further store information including at least one contextual relationship graph. The arrangement also includes an input/output interface through which a request for targeted content is made, wherein said request includes request-associated attributes. Further, the arrangement includes a controller that receives the request for targeted content through the input/output interface and selects targeted content using the request-associated attributes and at least one contextual relationship graph, wherein the controller further provides the selected targeted content through said input/output interface.

The earlier stated needs and others are met by still other disclosed embodiments that enable a computer-readable medium having computer-executable instructions for selecting targeted content using a controller in an arrangement, the computer-executable instructions performing the steps of: receiving, in the arrangement, a request for targeted content including request-associated attributes; and using a controller to select targeted content from one or more data repositories, wherein selecting targeted content includes utilizing, in the selection process, the request-associated attributes and at least one contextual relationship graph related to the information from which targeted content may be selected.

The earlier stated needs and others may further be met by a method of selecting targeted content via an arrangement, the method includes the steps of: receiving, in the arrangement, a request for targeted content a request for targeted content including request-associated attributes; and without human intervention, selecting targeted content from one or more data repositories, wherein selecting targeted content includes utilizing, in the selection process, the request-associated attributes and at least one contextual relationship graph related to the information from which targeted content may be selected.

Moreover, the disclosed embodiments solve these problems, at least in part, by utilizing an arrangement for determining the relative strength of a classification for a group of words. The arrangement including memory for storing a contextual relationship graph for a classification, wherein the contextual relationship graph includes a plurality of keywords and data regarding the relationship between each of the plurality of keywords. The arrangement also including a processor that receives the contextual relationship graph and a plurality of words to be analyzed by said processor, identifies occurrences of the relationships identified in the contextual relationship graph and determines the relative strength of classification based on the identified occurrences.

The earlier stated needs and others are further met by still other disclosed embodiments that enable a computer-readable medium having computer-executable instructions for determining the relative strength of a classification for a group of words, the computer-executable instructions causing the arrangement to perform the steps of: receiving, in the arrangement, a contextual relationship graph for a classification and a plurality of words to be analyzed; identifying occurrences of the relationships identified in the contextual relationship graph; and determining the relative strength of classification based on the identified occurrences.

Also the earlier stated needs and others may further be met by a method of discovering and assigning data regarding contextual content of a group of words via an arrangement, the method comprising the steps of: receiving, in the arrangement, a contextual relationship graph for a classification and a plurality of words to be analyzed; identifying occurrences of the relationships identified in the contextual relationship graph; and determining the relative strength of classification based on the identified occurrences.

FIG. 1 illustrates a system for providing targeted content 10 in which an arrangement 12 includes a controller 14 that controls one or more data repositories 16, a receiver module 18 and a transmitter module 20. In the example shown in FIG. 1, the arrangement 12 is an arrangement of a plurality of electronic devices and more specifically a linearly scalable computing system, such as, for example a stateless cluster of servers behind a load balancer that communicate with an associated cluster of data repositories. However, it is understood that the arrangement 12 may be accomplished using any number of systems and devices.

As described above, the arrangement 12 includes a controller 14. The controller 14 is described in greater detail below. However, generally and typically, the controller 14 is an integrated circuit including a central processing unit (CPU), input/output interfaces, other communication interfaces, memory, a clock generator and one or more peripherals. As used in the examples provided herein, the controller 14 may be a hardware component or a software component. For example, in one example, the controller 14 may be one or more microprocessors for controlling the arrangement 12. It is contemplated that the controller 14 used to accomplish the solutions provided herein may be embodied in one or more controllers 14. Accordingly, any use of the term controller herein is understood to refer to one or more controllers 14.

The controller 14 may be embedded in the arrangement 12. In the solution shown in FIG. 1, the controller 14 may be a microcontroller, or microprocessor, embedded in a scalable computing system. Accordingly, the controller 14 may be responsible for managing and controlling the operation of the arrangement 12 in which it is embedded. However, in the solutions provided herein, the controller 14 is primarily responsible for providing targeted content, as will be described in further detail below.

The one or more data repositories 16 shown in FIG. 1 may be embodied in one or more memory devices. The data repositories 16 may be any type of data storage devices, such as, for example, one or more databases. However, the solutions provided herein are not tied to any specific class of data storage, such as, for example, traditional relational databases.

The receiver module 18 and the transmitter module 20 shown in FIG. 1 may be any type of input and output devices for communicating with other arrangements, for example, through a network communication system. The receiver module 18 and the transmitter module 20 shown in FIG. 1 are just one example of the various input/output interfaces that may be utilized in the solutions provided herein. The receiver module 18 and transmitter module 20 are used to communicate with other devices as is described further below. Accordingly, the receiver module 18 and transmitter module 20 may be embodied in any type of communication device or devices that enable communication between arrangements, whether the arrangements are directly connected, connected through a network or otherwise in communication.

In the solution shown in FIG. 1, the system for providing targeted content 10 is a system in which targeted advertising is provided to viewers of a web page 22. However, it is understood that the system 10 described herein may be employed to provide any type of targeted content to any type of arrangement, electronic device or system. For example, the targeted content may be advertising, promotional offers, multimedia content, interactive content, news or other stories, service announcements, binary data (such as executables), a confluence of the above, etc. The targeted content may be provided to a standalone system (i.e., these systems may co-exist on the same system) networked computer, a mobile device, such as, for example, a cell phone, a television, a display, an appliance, a print device, electronic paper, etc. For example, the solutions provided herein may allow a web page 22 to play targeted audio content, such as music, that is appropriate contextually within the web page 22 as well as being targeted to a specific user 26.

As described above, the system for providing targeted content 10 shown in FIG. 1 provides targeted advertisements to web page viewers. In such an example, a web page 22 is provided with a targeted content request script 24 (i.e., a request widget). When a user 26 access the web page 22, the targeted content request script 24 makes a call to the system for providing targeted content 10 to receive a targeted advertisement based on the attributes of the web page 22, the attributes of the user 26 and the attributes associated with the user's request. The system for providing targeted content 10 then utilizes the attributes of the advertisements, from which the targeted content will be selected, as well as the attributes of the web page 22, the attributes of the user 26 and the attributes associated with the user's request to determine which advertisement or advertisements to provide to the user 26. The attributes of the advertisements, the web page 22, the user 26 and the user's request may include contextual attributes, profile attributes and behavioral attributes.

In the context of the targeted content request script 24 call in the solution shown in FIG. 1, contextual attributes may include, for example, attributes of the web page such as, keywords related to the webpage, the web site's URL, the web page's URL, the page/site hierarchy (derived from URL-patterns or URL-patterns per content-type), the web page creation date, the date the targeted content request script 24 was embedded in the web page, the web page content (e.g., whether the content has changed since the last call was processed, how frequently the content changes, string and tack graphs as described further below, etc.), the web page context (e.g., web page meta data, learned context based on historical user activity, etc.), etc. However, it is understood that the contextual attributes may include any attributes used to identify the location and/or context in which the targeted content will be provided.

In the context of the targeted content request script 24 call in the solution shown in FIG. 1, profile attributes may include, for example, the user's IP address, the number of page visits by the user, the number of site visits in which the targeted content request script 24 is embedded (i.e., tracks the user 26 across a number of web sites), general activity based relationships, click-though history, page view history, purchase history, the user's time zone, targeted content previously provided to the user 26, etc. Further, profile attributes may be stored in the data repositories 16 for reference by the system 10. For example, the email address of the user 26, or other unique identification, may be stored in the data repositories 16 and be associated with a set of attributes also stored in the data repositories 16. However, it is understood that the profile attributes may be any attributes used to identify the intended recipient of the targeted content.

In the context of the targeted content request script 24 call in the solution shown in FIG. 1, behavioral attributes may include, for example, conditional probability behavior and other learned features. For example, conditional probability behavior may be probable behavior based on an analysis of sets of users, whereas the other learned features may include Bayesian attributes whereby system feedback rewards and penalizes targeted content recommendations, neural networks, collaborative filtering, etc. For example, targeted content that elicits the desired response may send information back into the system for providing targeted content 10 to reinforce the recommendation whereas targeted content that does not elicit the desired response may send information back into the system for providing targeted content 10 to penalize the recommendation. However, it is understood that the behavioral attributes may be any attributes that may be helpful in understanding the probability of sets of users' actions to further increase the effectiveness of the targeted content.

As described above, the system for providing targeted content 10 receives the attributes of the web page 22, the attributes of the user 26 and other attributes associated with the user's request, which will be used to determine which advertisement or advertisements to provide to the user 26. The system for providing targeted content 10 uses the attributes received from the web page 22 and information stored in the data repositories to select targeted content to be provided to the user 26, as described further below. The information stored in the data repositories 16 may include location graphs that include keywords associated with a location in which targeted content may be requested. These location graphs may be compiled online or offline and with or without human intervention.

In addition to the contextual, profile and behavioral attributes described above, the system for providing targeted content 10 utilizes, in part, contextual relationships to select the content to be provided in response to a request for targeted content. As will be described further below, contextual relationships may be based on, for example, relationships between word meanings, distances between related words, punctuation, formatting, etc. Contextual relationships may be determined and utilized in the analysis of the content to be provided and the context in which the content is to be displayed, for example, the web page 22.

Examples of utilizing contextual relationships in the system for providing targeted content 10 include using contextual relationship graphs, such as, for example, content graphs (i.e., keywords and relationships related to the specific content available to be provided), category graphs (i.e., relationships between the general categories in which the specific content may be grouped) and/or content/category graphs (i.e., relationships between the categories and the contents) in conjunction with a string and tack process (described further below) to select targeted content to be provided to the user 26. The content graphs, category graphs and content/category graphs may be developed in online or offline processes and with or without human intervention. The various contextual relationship graphs may be stored in the data repositories 16.

The contextual relationship graphs described herein and utilized by the system 10 described herein are hierarchically structured graphs in which some edges are directional and define parent and child relationships, or in which, for some edges, one node contributes to the definition of the other node. Accordingly, the use of the term hierarchically structured is not limited to linearly hierarchically structures.

In the solution provided and described with respect to FIG. 1, content graphs may be created based on a vendor's catalog. In an example wherein the system for providing targeted content 10 provides targeted links to an online vendor's products on the web page 22, the content graphs may be created by first downloading an initial catalog of products from the vendor. The initial catalog may then be normalized into individual content graphs by identifying the attributes (values with known meanings, such as, for example, price) and keywords (values associated with a product without known meaning) from the titles and descriptions of each product and its respective category. Attributes may be of the form of hierarchical (such as "product category"), regional (such as "similar to"), discrete (such as "color"), or continuous/numerical (such as "price"). The normalization of content data increases the efficiency and effectiveness of the solutions provided herein.

In the solution provided and described with respect to FIG. 1, the category graphs may include information describing the relationships between the various categories. For example, the relationships may be defined in three categories: (i) is the same as; (ii) is parent of; and (iii) has the same children. These relationships describe how the categories relate to each other. For example, if "basketball" is a subcategory of "books" and "basketball" is also a subcategory of "tickets," the children of "books" and "tickets" may be related even if they don't share other attributes. Alternatively, the relationships may be otherwise defined by a greater or fewer number categories or using other categories entirely.

In the solutions provided and described with respect to FIG. 1, the content/category graphs may include information describing the relationships between each of the respective products and associated attributes.

It is contemplated that the product graphs, category graphs and content/category graphs may exist as any number of individual or combined graphs. For example, the content/category graph may be part of the product graph as opposed to being a separate file or data structure.

It will be understood by the descriptions herein that the contextual relationship graphs may each relate to a classification, whether it be a product, category or a relationship between products and categories, such that the contextual relationship graph may be used to determine how strongly certain content or text corresponds to a particular classification by evaluating the strength of the relationships identified in the graph as compared to those relationships in the content being evaluated.

In the solution provided in FIG. 1, in response to a request to provide targeted content, the controller 14 directs a process to discover the relationship between the environment in which the content will be provided (i.e., the web page 22) and the content from which the targeted content will be selected. The process may be carried out online and in real-time. The following is an example of a process that may be used to select targeted content. It is understood that the following in merely one embodiment of a process that may be employed and that other processes may be used to select targeted content.

The process described herein is a method of determining the context of an environment in which targeted content is to be provided by analyzing the text located within that environment, such as, for example, the text located on the web page 22. However, it is understood that a similar process may be used to determine the context of an environment by analyzing images, audio content, or any other multimedia content.

The process employed in the solution provided in FIG. 1 is as follows. First, the targeted content request script 24 is incorporated into the web page 22. This step may include associating keywords with the web page 22 that will be communicated to the arrangement 12 when the request for targeted content is made. The association may be formed by the operator of the web page 22, by the operator of the arrangement 12 or in any other manner. When the user 26 accesses the web page 22, the targeted content request script 24 calls the arrangement 12. The call may include transmitting to the arrangement 12 any associated keywords, any location graphs stored by the web page 22, the attributes of the web page 22 (including the web page URL or the text of the web page), the attributes of the user 26 and the attributes associated with the user's request. Upon receiving the request to provide targeted content, the controller 14 accesses any location graphs stored in the data repositories 16, which may provide additional information used to select targeted content. It should be noted that although, in this example, the request is initiated from outside of the system 10, the request may be initiated from within the system. For example, a request may be made to content stored within the data repositories 16. It should be further noted that the text to be analyzed may be from any source, such as, for example, the web page 22, a periodical, user-selected words, etc.

At this point, the controller 14 accesses each of the category graphs stored in the data repository 16 relating to content that may be selected as the targeted content. The keywords associated with each category graph are then compared to the text being analyzed and any occurrence of a keyword is identified and scored. For example, each category graph may have one unit added to its score value for each occurrence of an associated keyword. Scored may be positive for positive relationships and negative for negative relationships. Each category may be given further points to be added to the score based on the sum of the log of each of the keywords identified in the category's children categories' scores, or the sum of the fraction of each of the keywords identified in the category's children categories' scores or other such aggregation method. Alternatively, the scoring may be otherwise configured, for example, to included weighted scoring. For each relevant category in which a keyword has been identified or the score exceeds a given value, the product graphs related to that category may then be analyzed. For example, for each class of products (tickets, books, etc.) that receives a positive score, each of the product graphs within that class will be scored for keyword occurrences. Again, these scores may be based on keyword matches. Each relevant product graph, for example, each product graph including a keyword occurring in the web page 22, represents a product that may be selected to be provided as the targeted content.

The set of product graphs is further optimized by filtering the set using the attributes of the web page 22, the attributes of the user 26 and the attributes associated with the user's request. The results may further be filtered using any other contextual attributes, profile attributes and behavioral attributes, including user behavior feedback in which product graphs may be filtered out of the process based on low click through rates or other learned information that is collected and fed back into the system for providing targeted content 10. Examples of learned feedback may include learning new product attributes and relationships, learning web page relationships and learning new keywords to be associated with category graphs. Further, collaborative filtering, or other closed loop feedback, may be utilized. For example, a variety filter may be employed such that the variety filter may remove content from the selection process that has been previously selected for the user 26 within a specified time frame.

The controller 14 then selects the highest rated product graph and displays targeted content related to that product graph, for example, a link to a vendor's web site selling the product associated with the highest rated product graph.

Complex scoring methods may be employed using location graphs, product graphs, category graphs and product/category graphs. For example, a string and tack scoring process may be employed. An example of a string and tack scoring method is provided as follows:

The category graphs may include the following categories:

i. Sports→Baseball→Major League→National League→SF Giants ii. Sports→Baseball→History iii. Etc.

The keyword set might be:

i. Baseball ii. California iii. San Francisco iv. Etc.

Although "San Francisco" is two words, the term keywords, as used herein, may encompass both words and phrases. Accordingly, in this example, the two words "San Francisco" are treated as a single keyword.

Using these sets of keywords the following content may be analyzed:

"Xxxx Giants xxxx xxxx California, xxx xxx. Xxxxx xx New York. Xxxxx xxxxx Baseball xxx San Francisco."

The analysis of the above content using the given keywords may return a graph illustrating the distances between the defined keywords. Conceptually, this graph may appear as follows:

| Location (word order) | Word |
| --- | --- |
| 2 | Giants |
| 5 | California |
| 14 | Baseball |
| 16 | San Francisco |

Accordingly, a matrix can be built that would appear as follows:

|  | Giants | California | Baseball | San Francisco |
|---|---|---|---|---|
| Giants | 0 | 3 | 12 | 14 |
| California | 3 | 0 | 9 | 11 |
| Baseball | 12 | 9 | 0 | 2 |
| San Francisco | 14 | 11 | 2 | 0 |

As can be seen, only the top half of this matrix is needed and the data may be compiled and/or stored in a matrix as follows:

|  | Giants (1) | California (2) | Baseball (3) | San Francisco (4) |
|---|---|---|---|---|
| Giants (1) | x | 3 | 12 | 14 |
| California (2) | x | x | 9 | 11 |
| Baseball (3) | x | x | X | 2 |
| San Francisco (4) | x | x | X | x |

It may be further determined that any distance greater than 12 words is irrelevant. As a result, the following sparse matrix would result:

|  | Giants (1) | California (2) | Baseball (3) | San Francisco (4) |
|---|---|---|---|---|
| Giants (1) | x | 3 | 12 | x |
| California (2) | x | x | 9 | 11 |
| Baseball (3) | x | x | X | 2 |
| San Francisco (4) | x | x | X | x |

This sparse matrix can instead be represented by indexes as follows:
 i. {1,2}
 ii. {1,3}
 iii. {1,2,3}
 iv. {2,3}
 v. {2,4}
 vi. {2,3,4}
 vii. {3,4}

If a particular set, or subset were to appear more than once, it could be weighted to so reflect. The indexes created can then be used in the scoring and weighting of the product graphs and category graphs to be used in the process described above or other selection processes.

The selection process described herein may be one step in a broader process. For example, the process may be employed a first time to identify a category from which the targeted content will be selected, a second time to determine a choice set of content from the selected category from which to select the targeted content and a third time to select one of the items in the choice set, for example, based on collaborative filtering. In any case, the solutions provided herein may be utilized as a sub-algorithm within a larger algorithm in any manner as may be apparent.

A further example is provided to demonstrate how, in addition to identifying first order relationships between text and contextual relationship graphs, the solutions provided herein may be used to determine second order or higher relationships as well. For example, the keywords or attributes included in a contextual relationship graph may be referred to as nodes. Nodes may be related to each other through positive or negative relationships and the relationships may be weighted for various reasons, including distance between nodes in the text being analyzed (e.g., distance may, be defined by the number of words, characters, special characters, sentences, etc. between identified nodes) and/or the clustering/relationship of nodes within contextual relationship graph structures.

Nodes are not exclusive to any particular contextual relationship graph. Multiple graphs may incorporate the same node or nodes. The entire collection of nodes may form what is known as a power set. Accordingly, a simultaneous analysis of all potentially relevant contextual relationship graphs may be accomplished by performing an analysis of the power set of nodes. Since the collection of graphs may be contained in the same data repository 16 as the nodes, the data structures may be efficiently provided and utilized. This sharing of nodes allows the relationships between contextual relationship graphs to be defined. Additionally, when two or more graphs share nodes, the set of shared nodes may define an additional contextual relationship graph that can be used to determine the overall context of the content being examined.

For example a set of words that comprise the content being analyzed may include the following words (assuming the relationships between the words allow for the graphs described below): Charlie Batch; Troy Polamalu; Santonio Holmes; USC; Eastern Michigan; and Ohio State. The solutions provided herein may return first order relationship results identifying contextual relationship graphs for each of these players, which include nodes identifying the players and their alma maters. Additionally, the solutions provided herein may further determine second order (or higher) relationships as well. For example, using the nodes provided above, the arrangement 12 may determine that a commonality between each of the first order contextual relationship graphs is the "Pittsburgh Steelers" node, it may be deduced that the core contextual relationship graph, and therefore, the classification of the text being analyzed, is the Pittsburgh Steelers graph. Determining these types of second or third order relationships allows the arrangement to make stronger recommendations, such as, in this example, recommending Steelers tickets to the user 26 instead of a Charlie Batch Eastern Michigan jersey.

The analysis of text, keywords, nodes, etc. described herein is typically most effective when the analysis is performed on a power set. A power set is the set of all possible combinations of the individual elements within the set, a union of all subsets. Accordingly, analysis of the power set enables concurrent, or effectively concurrent, analysis of each of the variables, and each of the sets of variables, in every level of dependence and independence of the other variable and sets of variables.

Figure 2:
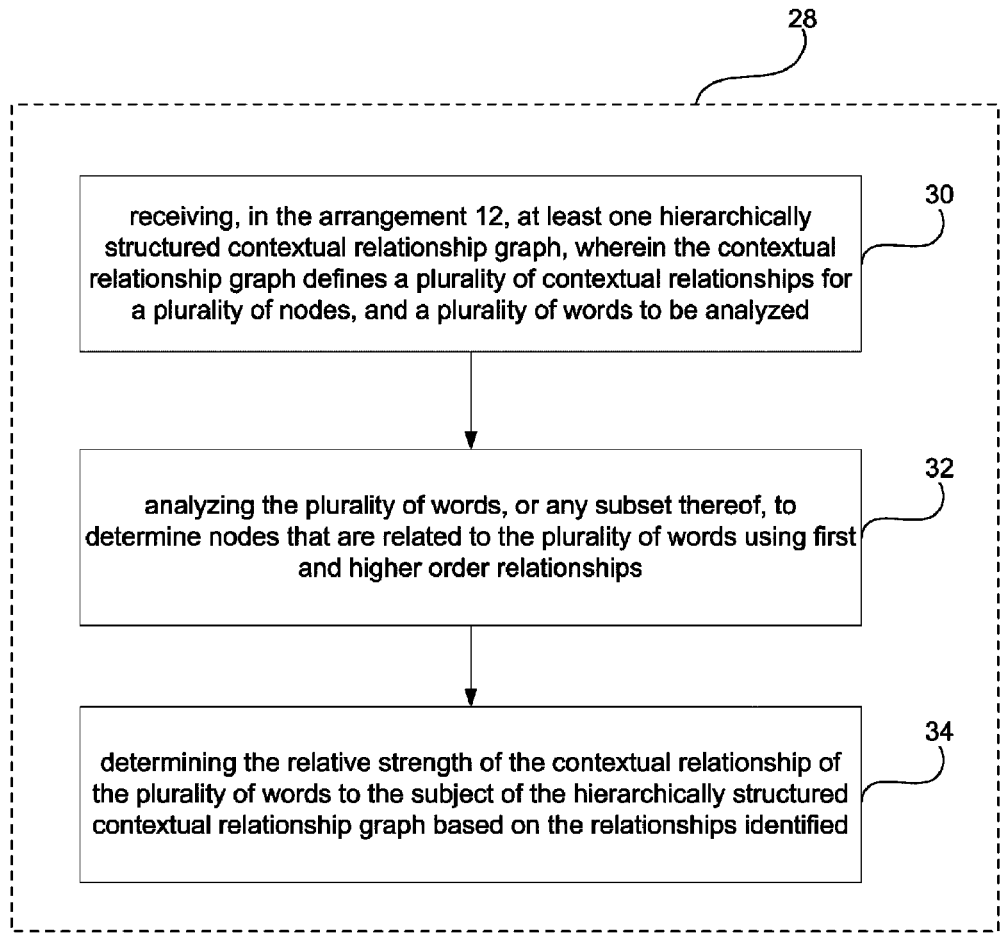
FIG. 2 is a flow chart depicting a method of discovering and assigning data regarding contextual content of a group of words via an arrangement.

FIG. 2 illustrates an example of a method 28 for discovering and assigning data regarding contextual content of a group of words via an arrangement 12, as described above with respect to a string and tack process. The method 28 may be embodied in the system 10 described above with respect to FIG. 1. Accordingly, the description provided above with respect to the system 10, is applicable to the method described herein. The first step 30 shown in FIG. 2 is receiving, in the arrangement 12, at least one hierarchically structured contextual relationship graph, wherein the contextual relationship graph defines a plurality of contextual relationships for a plurality of nodes, and a plurality of words to be analyzed. The second step 32 shown in FIG. 2 is analyzing the plurality of words, or any subset thereof, to determine nodes that are related to the plurality of words using first and higher order relationships. The third step 34 is determining the relative strength of the contextual relationship of the plurality of words to the subject of the hierarchically structured contextual relationship graph based on the relationships identified.

Figure 3:
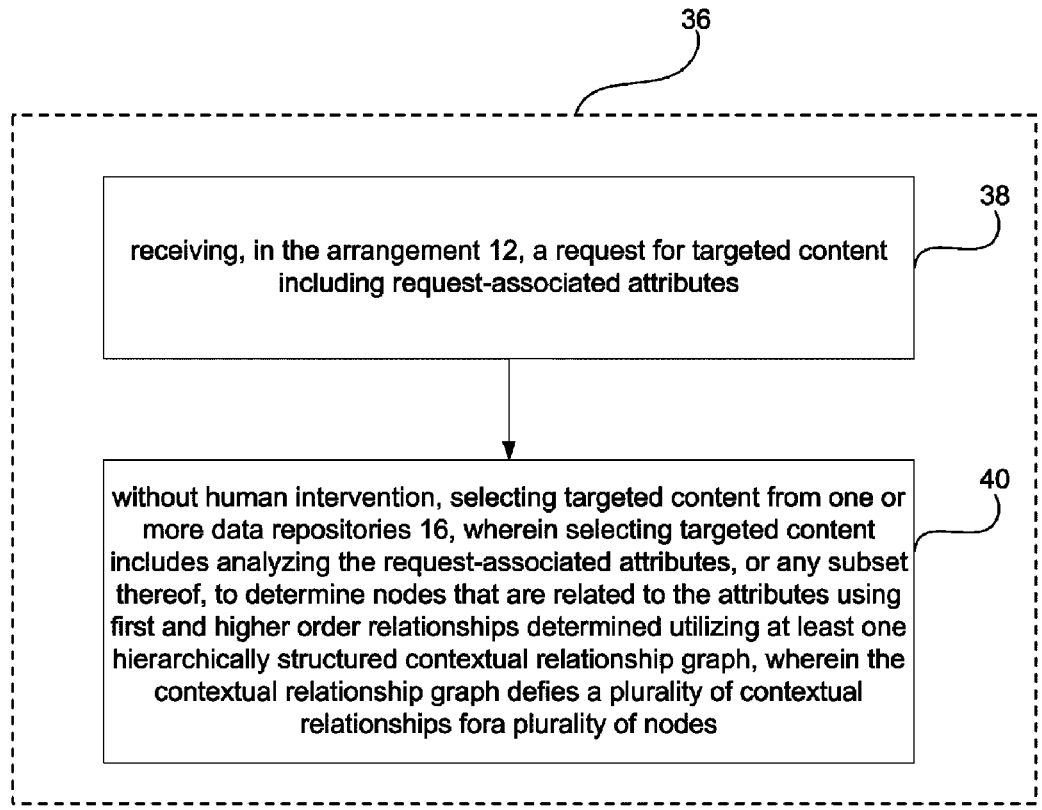
FIG. 3 is a flow chart depicting a method for providing targeted content.

FIG. 3 illustrates an example of a method 36 for selecting targeted content via an arrangement. The method 36 may be embodied in the system 10 described above with respect to FIG. 1. Accordingly, the description provided above with respect to the system 10, is applicable to the method described herein. The first step 38 shown in FIG. 3 is receiving, in the arrangement 12, a request for targeted content including request-associated attributes. The second step 40 shown in FIG. 3 is, without human intervention, selecting targeted content from one or more data repositories 16, wherein selecting targeted content includes analyzing the request-associated attributes, or any subset thereof, to determine nodes that are related to the attributes using first and higher order relationships determined utilizing at least one hierarchically structured contextual relationship graph, wherein the contextual relationship graph defines a plurality of contextual relationships for a plurality of nodes.

As shown, the system 10, methods 28 and 36 and processes described above with respect to the system 10 provide a solution to the challenges in providing targeted content.

As shown by the above description, aspects of the system 10 for providing targeted content are controlled by the controller 14. Typically, the controller 14 is implemented by one or more programmable data processing devices. The hardware elements operating systems and programming languages of such devices are conventional in nature, and it is presumed that those skilled in the art are adequately familiar therewith. Accordingly, any device that may be used to perform the functions described herein with respect to the controller 14 may be substituted for the controllers 14 described in the examples above. For example, in some instances the functions of the controller 14 may be embodied in programmable instructions, for example, on a CD-ROM, a flash drive or any other memory.

For example, the controller 14 may be a microprocessor in a portable arrangement, such as, for example, a cellular phone, a personal digital assistant, a audio/video playing device, etc. These systems including microprocessors are referred to generically herein as computer systems. In another example, the controller maybe a PC based implementation of a central control processing system. The PC based system contains a central processing unit (CPU), memories and an interconnect bus. The CPU may contain a single microprocessor (e.g. a Pentium microprocessor), or it may contain a plurality of microprocessors for configuring the CPU as a multi-processor system. The other components of the computer system described above include memories, including a main memory, such as a dynamic random access memory (DRAM) and cache, as well as a read only memory, such as a PROM, an EPROM, a FLASH-EPROM, or the like. The system also includes mass storage devices such as various disk drives, tape drives, etc. In operation, the main memory stores at least portions of instructions for execution by the CPU and data for processing in accord with the executed instructions.

The mass storage may include one or more magnetic disk or tape drives or optical disk drives, for storing data and instructions for use by CPU. For example, at least one mass storage system in the form of a disk drive or tape drive, stores the operating system and various application software as well as data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The computer system also includes one or more input/output interfaces for communications, shown by way of example as an interface for data communications with one or more processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the controller 14. For example, the computer system may include a graphics subsystem to drive the output display. The output display, for example, may include a cathode ray tube (CRT) display, or a liquid crystal display (LCD) or other type of display device. Although not shown, a PC type system implementation typically would include a port for connection to a printer. The input control devices for such an implementation of the computer system would include the keyboard for inputting alphanumeric and other key information. The input control devices for the computer system may further include a cursor control device (not shown), such as a mouse, a touchpad, a trackball, stylus, or cursor direction keys. The links of the peripherals to the computer system may be wired connections or use wireless communications.

The computer system runs a variety of applications programs and stores data, enabling one or more interactions via the user interface provided, and/or over a network to implement the desired processing.

The components contained in the system 10 are those typically found in general purpose computer systems. Although illustrated as a PC type device, those skilled in the art will recognize that the class of applicable computer systems also encompasses systems used as servers, workstations, network terminals, and the like. In fact, these components are intended to represent a broad category of such computer components that are well known in the art.

A software or program product may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Terms relating to computer or machine "readable medium" that may embody programming refer to any medium that participates in providing code or instructions to a processor for execution. Such a medium may take many forms, including but not limited to non-volatile media, volatile media, and transmission media. Non-volatile media include, for example, optical or magnetic disks, such as any of the storage devices in the computer system. Volatile media include dynamic memory, such as main memory. Transmission media include coaxial cables; copper wire and fiber optics including the wires that comprise a bus within a computer system. Transmission media can also take the form of electric or electromagnetic signals, or acoustic or light waves such as those generated during radio frequency or infrared data communications. In addition to storing programming in one or more data processing elements, various forms of computer readable media may be involved in carrying one or more sequences of one or more instructions to a processor for execution, for example, to install appropriate software in a system intended to serve as the controller 14.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A system for providing targeted content comprising:
one or more data repositories configured to store information from which targeted content may be selected and to store information including a hierarchically structured contextual relationship graph, wherein the contextual relationship graph defines a plurality of hierarchical relationships between a plurality of nodes within the contextual relationship graph that correspond to the stored information from which the targeted content may be selected, the plurality of nodes each having one or more associated keywords and one or more corresponding pieces of content;
an input/output interface that is configured to receive a request for targeted content, wherein said request includes request-associated attributes; and
a controller processor that is configured to analyze at least some of the request-associated attributes to identify nodes of the contextual relationship graph that are related to the request-associated attributes, and to provide targeted content from the one or more data repositories that is selected based on at least a number of the identified nodes,
wherein identifying of the nodes of the contextual relationship graph that are related to the request-associated attributes includes matching the at least some request-associated attributes with the one or more associated keywords for each of multiple of the plurality of nodes and includes selecting those multiple nodes as the identified nodes,
wherein selecting of the targeted content includes:
performing a calculation of a score for each of at least some of the identified nodes, the calculated score for each of the at least some identified nodes being based on a function of a quantity of (a) matches of the at least some request-associated attributes with the one or more keywords associated with the identified node being scored and of (b) matches of the at least some request-associated attributes with the one or more keywords associated with other of the identified nodes that are identified as having a subordinate relationship in the contextual relationship graph to the identified node being scored;
selecting one or more of the at least some identified nodes whose calculated scores are above the calculated scores of other of the at least some identified nodes that are not selected; and
identifying at least one of the one or more corresponding pieces of content for each of the selected one or more identified nodes as the selected targeted content, and
wherein the providing of the selected targeted content by the controller processor occurs through the input/output interface.

2. The system of claim 1 wherein said one or more data repositories are databases.

3. The system of claim 1 wherein said information from which the targeted content may be selected is one of a group consisting of: advertising, promotional offers, multimedia content, interactive content, news or other stories, service announcements and binary data.

4. The system of claim 1 wherein said contextual relationship graph is selected from a group consisting of: a content graph, a category graph, and a content/category graph.

5. The system of claim 4 wherein the contextual relationship graph is a category graph representing a hierarchy of multiple categories of products or services.

6. The system of claim 4 wherein the contextual relationship graph is a category graph representing multiple categories of at least one of products and of services from a plurality of vendors.

7. The system of claim 5 wherein the nodes in the category graph correspond to a description of the products or services, and wherein the identifying of the nodes of the contextual relationship graph that are related to the request-associated attributes includes determining nodes that have a first order relationship to the request-associated attributes.

8. The system of claim 5 wherein at least some of the nodes in the category graph correspond to category names for the products or services, and wherein the identifying of the nodes of the contextual relationship graph that are related to the request-associated attributes includes determining one or more of the at least some nodes that have a first order relationship to the request-associated attributes.

9. The system of claim 1 wherein said request-associated attributes include a plurality of words.

10. The system of claim 9 wherein the analyzing of the at least some request-associated attributes includes determining which of the plurality of words to analyze based at least in part on a distance between words within the plurality of words.

11. The system of claim 1 wherein the performing of the calculation of the score for each of the at least some identified nodes is based on a sum of a log of a quantity of keyword matches for identified nodes in the contextual relationship graph that have a subordinate relationship to the identified node being scored.

12. The system of claim 1 wherein the identifying of the nodes of the contextual relationship graph that are related to the request-associated attributes further includes using a weighted system for prioritizing the identified nodes by determining other lower priority nodes in the contextual relationship graph that have a subordinate relationship to one or more of the identified nodes based on a number of associations of the request-associated attributes with the one or more keywords associated with each of the other lower priority nodes.

13. The system of claim 1 wherein each of the plurality of nodes represents at least one of a category and of an attribute.

14. The system of claim 1 wherein the identifying of the nodes of the contextual relationship graph that are related to the request-associated attributes is based at least in part on an analysis of both positive and negative relationships.

15. The system of claim 1 wherein said request-associated attributes include attributes selected from a group consisting of: contextual attributes, profile attributes and behavioral attributes.

16. The system of claim 1 wherein said request-associated attributes include data regarding a location in which the selected targeted content is to be provided.

17. The system of claim 1 wherein said request-associated attributes include data regarding a target to which the selected targeted content will be directed.

18. The system of claim 1 wherein said controller processor is a microprocessor.

19. The system of claim 1 wherein each of the plurality of nodes represents at least one category, and wherein the hierarchical relationships between the plurality of nodes are contextual relationships that define categories and sub-categories.

20. The system of claim 1 wherein at least some of the hierarchical relationships between the plurality of nodes are contextual relationships between the one or more keywords associated with each of the plurality of nodes and one or more pieces of related particular content of the stored information.

21. The system of claim 1 wherein each of the plurality of nodes represents at least one of one or more categories, and wherein the hierarchical relationships between the plurality of nodes are contextual relationships between categories and pieces of related particular content of the stored information.

22. A non-transmission computer-readable storage medium having computer-executable instructions stored thereon, the computer-executable instructions configuring a computer system to perform steps of:

receiving a request for targeted content including request-associated attributes;

identifying one or more of a plurality of nodes of a hierarchically structured contextual relationship graph that are related to the request-associated attributes, the identified nodes being selected from at least some of the plurality of nodes that each have one or more associated keywords and that correspond to information about content stored in one or more data repositories, and wherein the identifying of the one or more nodes includes matching at least some of the request-associated attributes with the one or more keywords associated with each of the identified nodes; and selecting the targeted content for the request from the content stored in the one or more data repositories based on at least one of a number of the identified nodes and of a weighted system for prioritizing the identified nodes, wherein selecting of the targeted content based on the number of the identified nodes includes:

performing a calculation of a score for each of the identified nodes, the calculated score for each identified node being based on a function of a quantity of (a) matches of the at least some request-associated attributes with the one or more keywords associated with the identified node being scored and of (b) any matches of the at least some request-associated attributes with the one or more keywords associated with other of the at least some nodes that have a subordinate relationship in the contextual relationship graph to the identified node being scored;

selecting at least one of the identified nodes having a highest calculated score; and identifying one or more corresponding pieces of content for each of the selected at least one identified nodes as the selected targeted content, and wherein selecting of the targeted content based on the weighted system includes performing further analysis for at least one of the identified nodes whose calculated score exceeds a particular value, the performing of the further analysis including determining the selected targeted content.

23. The computer-readable medium of claim 22 wherein the configured computer system includes the one or more data repositories, and wherein said request originates from the configured computer system.

24. The computer-readable medium of claim 22 wherein said request originates externally to a system that includes the one or more data repositories.

25. The computer-readable medium of claim 22 wherein the configured computer system includes a controller that automatically performs the selecting of the targeted content, and wherein the targeted content selected is a choice set from which more specifically targeted content will be selected.

26. The computer-readable medium of claim 22 wherein the selecting of the targeted content includes utilizing closed loop feedback to filter some of the content stored in the one or more data repositories.

27. The computer-readable medium of claim 22 wherein the request-associated attributes include an identification of a recipient of the targeted content, and wherein the selecting of the targeted content includes utilizing a variety filter to remove content that has been previously selected for the recipient.

28. The computer-readable medium of claim 22 wherein the selecting of the targeted content includes first selecting a category from which the targeted content will be selected, then selecting a choice set from the selected category, and then selecting the targeted content from the selected choice set.

29. The computer readable medium of claim 22 wherein the identifying of the one or more nodes includes comparing the request-associated attributes to the plurality of nodes of the hierarchically structured contextual relationship graph to identify the one or more nodes.

30. The computer readable medium of claim 22 wherein the computer-executable instructions further configure the computer system to perform the step of providing one or more indications of the selected targeted content in response to the received request.

31. The computer readable medium of claim 22 wherein the identified one or more nodes correspond to particular content of the content stored in the one or more data repositories.

32. The computer readable medium of claim 22 wherein the identified one or more nodes represent at least one category, and wherein hierarchical relationships between the identified one or more nodes are contextual relationships that define categories and sub-categories.

33. The computer readable medium of claim 22 wherein at least some hierarchical relationships between the identified one or more nodes are contextual relationships between the one or more keywords associated with the identified one or more nodes and one or more pieces of related stored content.

34. The computer readable medium of claim 22 wherein the identified one or more nodes represent at least one of one or more categories and one or more particular pieces of content, and wherein hierarchical relationships between the identified one or more nodes are contextual relationships between categories and pieces of related particular content.

35. A computer-implemented method for selecting targeted content comprising:

receiving a request for targeted content, the request including request-associated attributes;

automatically comparing the request-associated attributes to at least one hierarchically structured contextual relationship graph to identify one or more of a plurality of nodes of one of the at least one contextual relationship graph that are related to the request-associated attributes, wherein the one contextual relationship graph defines a plurality of hierarchical contextual relationships between the plurality of nodes, wherein the identified nodes are selected from at least some of the plurality of nodes that each have one or more associated keywords and that correspond to stored content that is available to be selected, and wherein the automatic comparing is performed by a programmed computing system and includes matching at least some of the request-associated attributes with the one or more keywords associated with each of the identified nodes;

automatically selecting targeted content based on at least one of a number of the identified one or more nodes and of a weighted system for prioritizing the identified one or more nodes, the automatic selecting being performed by the programmed computing system, wherein selecting of the targeted content based on the number of the identified nodes includes:

performing a calculation of a score for each of the identified nodes, the calculated score for each identified node being based on a function of a quantity of (a) matches of the at least some request-associated attributes with the one or more keywords associated with the identified node being scored and of (b) any matches of the at least some request-associated attributes with the one or more keywords associated with other of the at least some nodes that have a subordinate relationship in the contextual relationship graph to the identified node being scored;

selecting at least one of the identified nodes having a highest calculated score; and identifying one or more corresponding pieces of content for each of the selected at least one identified nodes as the selected targeted content, and wherein selecting of the targeted content based on the weighted system includes performing further analysis for at least one of the identified nodes whose calculated score exceeds a particular value, the performing of the further analysis including determining the selected targeted content; and providing one or more indications of the selected targeted content in response to the received request.

36. The method of claim 35 wherein the identified one or more nodes represent at least one of a category and an attribute.

37. The method of claim 35 wherein the automatic selecting of the targeted content is performed based on the number of the identified one or more nodes.

38. The method of claim 35 wherein the automatic selecting of the targeted content is based at least in part on the weighted system for prioritizing the identified one or more nodes.

39. The method of claim 35 wherein each of the identified one or more nodes represents at least one category, and wherein the hierarchical contextual relationships between the identified one or more nodes define relationships between categories and sub-categories.

40. The method of claim 35 wherein at least some of the hierarchical contextual relationships between the identified one or more nodes are relationships between the one or more keywords associated with each of the identified nodes and one or more pieces of related particular content available to be used as the targeted content.

41. The method of claim 35 wherein each of the identified one or more nodes represents at least one of one or more categories and one or more particular pieces of content that are available to be used as the targeted content, and wherein the hierarchical contextual relationships are relationships between one or more categories and one or more related pieces of the particular pieces of content.

* * * * *